United States Patent Office 3,383,563
Patented May 14, 1968

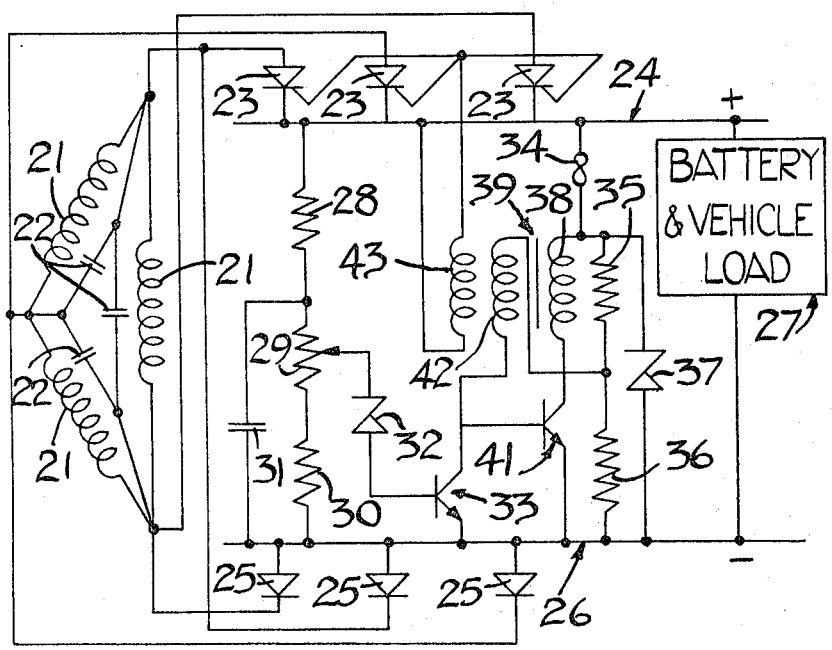

3,383,563
BATTERY CHARGING SYSTEMS FOR ROAD VEHICLES
Maurice James Wright, Harborne, Birmingham, England, assignor to Joseph Lucas (Industries) Limited, Birmingham, England
Filed Dec. 6, 1965, Ser. No. 511,675
Claims priority, application Great Britain, Dec. 9, 1964, 50,042/64
3 Claims. (Cl. 317—33)

ABSTRACT OF THE DISCLOSURE

In a battery charging system a permanent magnet alternator supplies power to a pair of supply lines through a full wave rectifier including a diode and a thyristor for each phase of the alternator. The battery of the vehicle is connected in parallel with the vehicle load between the supply lines, and also connected between the supply lines is an oscillator which supplies signals to the gates of the thyristors to keep them conducting so that the full wave rectifier allows power to be supplied from the alternator to the supply lines, but cuts off this power if the voltage between the supply lines rises above a predetermined value. In order to protect the vehicle loads, a fuse or similar device is connected in series with the oscillator, and a Zener diode or similar device is connected in parallel with the oscillator, so that the oscillator will cut off in the event of an overload condition.

---

This invention relates to battery charging systems for road vehicles.

A system according to the invention comprises in combination a pair of supply lines between which the battery is connected, a permanent magnet alternator supplying power to the supply lines through a full wave rectifier which includes for each phase of the alternator a diode and a thyristor, an oscillator connected across the supply lines and coupled to the gate of each thyristor so that when the oscillator is operating each thyristor acts as a diode, means for stopping operation of the oscillator when the voltage between the supply lines is above a predetermined value, a first device connected in series with the oscillator between the supply lines, and a second device connected in parallel with the oscillator, the first device having the property of becoming open-circuited when the current flowing through it exceeds a predetermined value, and the second device having a resistance which is high when the voltage across it is below the normal working voltage of the oscillator but decreases substantially above the normal working voltage of the oscillator.

The circuit is operative for A.C. or D.C. and in either case the first device could be a fuse or an overcurrent relay, and protects the oscillator from overcurrent conditions. The second device could be a Zener diode, a four-layer diode or a non-linear resistance, so as to protect the oscillator during the time taken for the first device to operate.

The accompanying drawing is a circuit diagram illustrating one example of the invention.

Referring to the drawing, there is provided a three-phase delta-connected permanent magnet alternator having the windings 21 thereof bridged by three capacitors 22 respectively. The phase points are connected to the anodes of three thyristors 23 having their cathodes connected to a positive D.C. line 24, and are also connected to the cathodes of three diodes 25 having their anodes connected to a negative D.C. line 26. The battery of the vehicle and any further load to be fed by the alternator are connected in parallel between the lines 24, 26 as indiated at 27.

Connected in series between the lines 24, 26 are three resistors 28, 29, 30, the resistors 29, 30 being bridged by a capacitor 31. A variable point on the resistor 29 is connected to the cathode of a Zener diode 32, the anode of which is connected to the base of an n-p-n transistor 33 the emitter of which is connected to the line 26. Also connected between the lines 24, 26 is a series circuit incorporating a fuse 34 a resistor 35 and a resistor 36, a point intermediate the fuse 34 and resistor 35 being connected to the line 26 through the cathode and anode of a Zener diode 37, and being further connected through the primary winding 38 of a transformer 39 to the collector of an n-p-n transistor 41. The transistor 41 has its emitter connected to the line 26, and its base connected to the collector of the transistor 33, and, through a feedback winding 42 on the transformer 39, to a point intermediate the resistors 35, 36. The transformer further incorporates a secondary winding 43 one end of which is connected to the line 24, and the other end of which is connected to the gates of the thyristors 23.

The arrangement is such that as long as the voltage between the lines 24, 26 is below a predetermined value, the Zener diode 32 does not conduct, so that the transistor 33 is off. In these circumstances, the transistor 41 and its associated windings form an oscillator, the output of which is fed to the gates of the thyristors 23 to render them conductive, so that in effect they act as diodes, and form with the diodes 25 a full-wave bridge rectifier. However, when the predetermined value is exceeded, the Zener diode 32 breaks down and the transistor 33 is rendered conductive. Current flowing through the transistor 33 switches off the transistor 41, and so when the thyristors are reverse biased at the end of a cycle, they do not receive any further gate current from the oscillator and consequently they do not switch on again. The voltage between the lines 24, 26 now falls, and the capacitor 31 discharges through the resistors 29, 30 to hold the first Zener diode on until the capacitor has partly discharged, after which the Zener diode 32 cuts off and the oscillator operates again so that the thyristors 23 conduct and the capacitor 31 is re-charged. The value to which the current flowing through the Zener diode 32 must rise to stop oscillations is greater than the current through the Zener diode 32 when oscillations recommence.

In this example, the fuse 34 and the Zener diode 37 act respectively as the first and second devices specified in the claims. In the event of a fault, resulting in a high voltage between the lines 24, 26 (for example, disconnection of the battery), the fuse will become open-circuited when the current flowing through it exceeds a predetermined value. During the time it takes for this current to build up, the Zener diode 37 will break down, and consequently protection will be afforded to the circuit components during the period immediately before the fuse becomes open-circuited. It will be appreciated that as soon as the fuse is open-circuited, no pulses are applied to the thyristors 23, and consequently the voltage between the lines 24, 26 falls.

In the drawing, all the devices liable to damage are protected by the fuse 34, but the resistance chain 28, 29, 30 and its associated components are not. This does not matter in practice, but if desired the resistor 28 could be connected to the line 24 through the fuse 34.

Having thus described my invention what I claim as new and desire to secure by Letters Patent is:

1. A battery charging system for a road vehicle, comprising in combination a pair of supply lines between which the battery is connected, a permanent magnet alternator supplying power to the supply lines through a full wave rectifier which includes for each phase of the alternator a diode and a thyristor, an oscillator connected across the supply lines and coupled to the gate of each thyristor so that when the oscillator is operating each thyristor acts as a diode, means for stopping operation of the oscillator when the voltage between the supply lines is above a predetermined value, a first device connected in series with the oscillator between the supply lines, and a second device connected in parallel with the oscillator, the first device having the property of becoming open-circuited when the current flowing through it exceeds a predetermined value, and the second device having a resistance which is high when the voltage across it is below the normal working voltage of the oscillator but decreases substantially above the normal working voltage of the oscillator.

2. A circuit as claimed in claim 1 in which the first device is a fuse.

3. A circuit as claimed in claim 1 in which the second device is a Zener diode.

References Cited

UNITED STATES PATENTS

| | | | |
|---|---|---|---|
| 470,697 | 3/1892 | Morse | 317—16 |
| 894,705 | 7/1908 | Schattner | 317—16 |
| 2,925,548 | 2/1960 | Scherer. | |
| 3,187,224 | 6/1965 | Massena | 317—16 |
| 3,215,896 | 11/1965 | Shuttuck et al. | 317—16 |
| 3,238,418 | 3/1966 | Heft | 317—33 |
| 3,253,189 | 5/1966 | Wook | 317—16 |
| 3,068,393 | 12/1962 | Blackburn | 322—28 |
| 3,315,141 | 4/1967 | Wright et al. | 322—28 X |
| 3,350,627 | 10/1967 | Wright | 322—28 |

FOREIGN PATENTS 973,013 10/1964 Great Britain.

MILTON O. HIRSHFIELD, *Primary Examiner.*

R. V. LUPO, *Assistant Examiner.*